United States Patent [19]

Sato et al.

[11] Patent Number: 4,913,887
[45] Date of Patent: Apr. 3, 1990

[54] PRODUCTION OF BORON NITRIDE

[75] Inventors: Tadao Sato; Toshihiko Ishii, both of Ibaraki, Japan

[73] Assignee: National Institute for Researches in Inorganic Materials, Ibaraki, Japan

[21] Appl. No.: 642,717

[22] Filed: Aug. 22, 1984

Related U.S. Application Data

[63] Continuation of Ser. No. 440,998, Nov. 12, 1982, abandoned.

[30] Foreign Application Priority Data

Apr. 15, 1982 [JP] Japan .................................. 57-63067

[51] Int. Cl.⁴ ............................................. C01B 21/06
[52] U.S. Cl. ..................................................... 423/290
[58] Field of Search ........................................ 423/290

[56] References Cited

U.S. PATENT DOCUMENTS

| | | | |
|---|---|---|---|
| 2,839,366 | 6/1958 | Kamlet ................................. | 423/290 |
| 3,561,920 | 5/1968 | Kinter et al. ......................... | 423/290 |
| 4,064,225 | 12/1977 | Chew et al. .......................... | 423/290 |
| 4,150,097 | 4/1979 | Hough et al. ........................ | 423/285 |
| 4,157,927 | 6/1979 | Chew et al. .......................... | 423/286 |

OTHER PUBLICATIONS

H. Sumiya et al., "High Pressure Synthesis of Cubic Boron Nitride from Amorphous State", Mat. Res. Bull., vol. 18, pp. 1203–1207, (1983).

Chemical Abstracts, vol. 92, 1980, Abstract No. 149405t, Volkov, V. V. et al., "Borazole".

*Gmelin Handbuch der Anorganischen Chemie,* Springer Verlag, New York, 1983, p. 384.

Research Report No. 27 by National Institute for Researches in Inorganic Materials, 1981, "Study on Boron Nitride", Sections 2.1.2, 2.1.3 (part).

*Primary Examiner*—John Doll
*Assistant Examiner*—R. Bruce Breneman
*Attorney, Agent, or Firm*—Oblon, Spivak, McClelland, Maier & Neustadt

[57] ABSTRACT

A process for producing boron nitride comprises heating a mixture consisting of borohydride of alkali metal and ammonium chloride at a temperature range of from 800° to 2200° C. in a non-oxidizing atmosphere.

4 Claims, 2 Drawing Sheets

PRODUCTION OF BORON NITRIDE

This application is a continuation of application Ser. No. 440,998, filed Nov. 12, 1982, now abandoned.

This invention is concerned with production of boron nitride.

For the process for producing an atmospheric pressure type boron nitride in an industrialized scale, there has so far been adopted a method, in which boric acid, boron oxide, or borate is reductively nitrized with an organic nitrogen compound such as, for example, urea, and so on. In boron nitride obtained by this method, there remains, as impurity, oxygen and carbon which are originally contained in raw material. For instance, amorphous boron nitride available in general market contains approximately 20% of oxygen, and even high purity boron nitride of hexagonal system contains approximately 0.5% of oxygen. Further, these types of boron nitride also contain carbon. When boron nitride containing therein a large quantity of oxygen is used as the raw material for producing cubic system boron nitride by the high pressure phase-transition, the rate of yield of such cubic system boron nitride lowers to an extreme degree. Also, boron nitride containing therein oxygen in a certain quantity reacts with metal material to become incapable of use. For example, boron nitride containing therein 2% of oxygen reacts with molybdenum at a temperature of 1800° C. or below. Therefore, production of high purity boron nitride with less content of oxygen brings great benefit.

For production of the high purity boron nitride not containing oxygen, use of a raw material compound not containing therein oxygen is the best way.

For such production method, there has so far been known one, in which boron chloride gas or hydrogenated boron gas is mixed with ammonia, then the mixture is heated at a high temperature to deposit boron nitride from a gas phase. This method, however, has many shortcomings such that, since the raw material is highly toxic and corrosive, the material handling should be done with utmost of care, that the tubings in the production system tend to be readily clogged due to deposition of an intermediate reaction product, that boron nitride as produced is difficult to be captured, and others.

In view of the above mentioned disadvantages inherent in the known method for producing boron nitride, it is a primary object of the present invention to provide an improved method for production of boron nitride, from which all the shortcomings inherent in the conventional methods have been successfully eliminated, and which is capable of safely and readily producing boron nitride with less oxygen content.

With a view to attaining the above mentioned object, the present inventor has conducted strenuous research activities, as the result of which he has discovered a fact that boron nitride of high purity with less content of oxygen could be obtained when a mixture of borohydride of alkali metal such as Me($BH_4$), where Me denotes an alkali metal, and ammonium chloride is heated at a temperature range of from 800° to 2200° C. in a non-oxidizing atmosphere, on the basis of which finding the present invention has been completed.

According to the present invention, in general aspect thereof, there is provided a process for producing boron nitride, which comprises heating a mixture consisting of borohydride of alkali metal and ammonium chloride at a temperature range of from 800° to 2200° C. in a non-oxidizing atmosphere.

The foregoing object, other objects, as well as specific reaction mechanism of the present invention will become more apparent and understandable from the following detailed description thereof in connection with a few preferred embodiments and in reference to the accompanying drawing.

Figure 1:
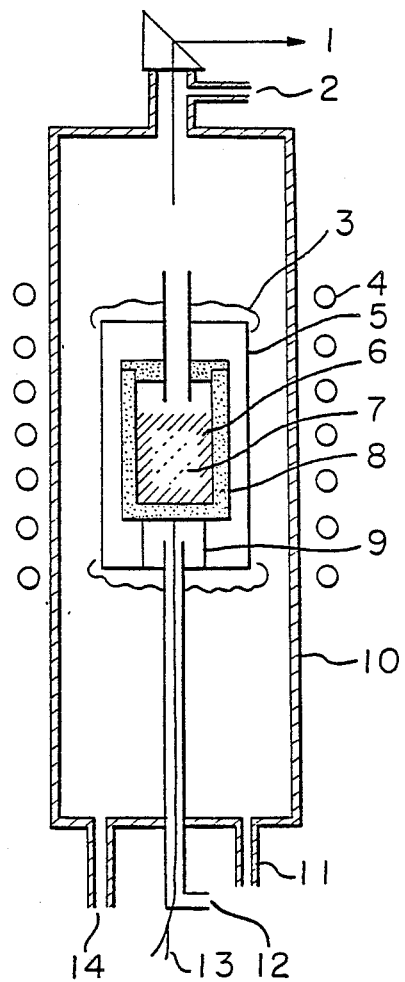
FIG. 1 is a longitudinal cross-section of a high frequency heating furnace showing one practical mode of embodiment of a heating device for use in practicing the method of the present invention.

In the following, the present invention will be described in detail with reference to a few preferred embodiments.

Borohydride of alkali metal such as, for example, $LiBH_4$, $NaBH_4$, $KBH_4$, etc. for use in the present invention may be used either in simple form or in mixture with other.

A mixing ratio between Me($BH_4$) and ammonium chloride should preferably be such that nitrogen is in an equivalent quantity and above in the mole ratio with respect to boron. When the ratio of boron is high, amorphous boron mixes into the resulting boron nitride to lower its purity. Ammonium chloride, even in an excessive amount, can be readily dispersed by heating, so that the compound may safely be in an excessively large quantity for the purpose of mixing with borohydride of alkali metal. Mixing of both compounds should preferably be done in a dry gas, because, when they are mixed in the atmosphere, moisture is absorbed into the mixture to produce boric acid which is liable to cause presence of oxygen as an impurity in the product.

A crucible to put the mixture in is required to be non-reactive with the mixture during the heating. A preferred example of such crucible is made of, for example, a sintered body of boron nitride. A graphite crucible is not preferable for the purpose, since it not only reacts with the mixture to be worn out of itself, but also carbon inevitably mixes into the resulting product. In order to prevent the substance constituting the crucible from mixing into the resulting product, a method of lining the inner wall and the top portion of the crucible with ammonium chloride, and then charging the raw material mixture in the crucible is effective.

Any type of heating source may be used. In particular, a high frequency heating is preferable, since the temperature rise in the furnace wall is low, hence corrosion of the furnace wall due to decomposed gas is low. An atmosphere for the heating operation should be non-oxidizing, otherwise oxygen is inevitably contained in the end product. For the non-oxidizing gas, nitrogen gas, for example, is preferred, because its refining can be done easily and at a low cost, and, moreover, it suppresses decomposition of boron nitride at a high temperature condition. It goes without saying, however, that ammonia gas, argon gas, and so on may also be used for this purpose. It has been made clear from the differential thermal analysis that the production reaction of boron nitride from a mixture of Me($BH_4$), e.g., $KBH_4$, and ammonium chloride can be divided mainly into three stages, as follows:

The first stage reaction is an endothermic reaction, due to double decomposition and dehydrogenation of the mixture, the reaction equation of which is as follows.

$$KBH_4 + NH_4Cl \rightarrow KCl + BNH_{8-x} + x/2\ H_2$$

When the double decomposition reaction takes place at a low temperature, e.g., 200° C. or below, it produces a vaporizing compound such as borazole, etc., which scatters. KBH$_4$ and NH$_4$Cl remain stable upto a temperature of 300° C., and the mixture thereof brings about the double decomposition reaction at a temperature in the vicinity of 300° C. The reaction product is less dispersive, because of its having a high boiling point.

The second stage reaction is also the endothermic reaction due to the dehydrogenation, which starts at a temperature of about 600° C. This reaction changes into an exothermic reaction due to polymerization at the third stage, as the dehydrogenation proceeds, and production of boron nitride completes.

By this heating, the salts as by-product are also subjected to sublimation at the same time. The elevation of the reaction temperature needs not be particularly controlled for obtaining boron nitride of satisfactory performance, although an abrupt temperature increase should be avoided, because the raw material brings about abrupt decomposition thereby and scatters in all directions. In order to obtain homogeneous born nitride with good yield, it is preferable that the temperature rise be effected gradually or stepwisely after completion of every reaction stage so as to make it possible that the subsequent reaction stage may follow smoothly.

For the calcination at the ultimate stage, a temperature not reaching 800° C. renders the dehydrogenation reaction to be very slow. At a temperature in the vicinity of 1100° C., hexagonal system boron nitride appears. However, when the temperature exceeds 2200° C. in nitrogen gas at 1 atmospheric pressure, there takes place decomposition of boron nitride. Therefore, in order to obtain boron nitride not containing hexagonal system boron nitride in a large quantity, the temperature for the calcination be in a range of from 800° to 1100° C., or preferably from 1100° to 1060° C., and, in order to obtain boron nitride containing a large amount of hexagonal system boron nitride, the calcining temperature be in a range of from 1100° to 2200° C., or more preferably, from 2000° to 2200° C.

It has been found out that boron nitride obtained by the method of this invention is white or light yellow powder, and the content of boron nitride in the final product is 99% and above with very small amount of salts contained therein, but with the oxygen content of below the possible detection limit. When the heating is done at a low temperature, the principal component in the product is the amorphous boron nitride, while, at the time of a high temperature heating, hexagonal system boron nitride is the principal constituent, presence of a small quantity of rhombohedral system boron nitride being observed in either case.

According to the method of the present invention, the raw material to be used is a solid substance and having no toxicity and corrosive property unlike that in the conventional method. On account of this, the production operation can be done easily and safely with less damage to the furnace. In particular, since the raw material does not contain therein oxygen, the end product containing therein least oxygen can be obtained. Furthermore, the amorphous boron nitride to be obtained by the low temperature heating does not contain therein oxygen and hexagonal system boron nitride. As the consequence of this, when the product is used as the raw material for producing cubic system boron nitride by the shock compression method, there is no possibility of wurtzite structure boron nitride being produced as by-product and mixing into the cubic system boron nitride. Moreover, since the amorphous boron nitride contains therein a small amount of rhombohedral system boron nitride, its conversion into cubic system boron nitride is easy, hence a high grade cubic system boron nitride can be obtained with good yield. Also, when this amorphous boron nitride is used as the raw material for producing sintered body of cubic system boron nitride by the static high temperature and high pressure method, there can be obtained a sintered body of the cubic system boron nitride in high density and having a very fine and homogeneous composition, and various other advantages.

With a view to enabling those skilled in the art to put the method of producing boron nitride according to the present invention into practice, a few preferred examples are presented hereinbelow. It should, however, be understood that these examples are illustrative only, and they are not limiting the scope of the present invention as recited in the appended claims.

EXAMPLE 1

KBH$_4$ and NH$_4$Cl were mixed at a mol ratio of 1:1.5 in a dry air, the mixture was then placed in a crucible made of a sintered body of boron nitride, and then the crucible was positioned in a high frequency heating furnace with graphite being used as a heat generating body. The furnace interior was evacuated to remove adsorbed water to the raw material mixture to a satisfactory degree, after which nitrogen gas was introduced into the furnace.

The construction of the high frequency heating furnace is as shown in FIG. 1. In the drawing, a reference numeral 1 designates an optical pyrometer, a numeral 2 refers to an inlet for nitrogen gas, a numeral 3 denotes a heat insulating material, and a reference numeral 4 designates a high frequency heating coil which heats a graphite heat generating body 5. A numeral 7 refers to a mixture powder of KBH$_4$ and NH$_4$Cl, the top surface of which is covered with ammonium chloride 6. A numeral 8 refers to a crucible made of a sintered body of boron nitride, and a numeral 9 denotes a supporting table for the crucible. A reference numeral 10 designates a quartz tube, 11 a gas discharge port for creating the vacuum, 12 a nitrogen gas inlet, 13 a thermocouple, and 14 a nitrogen gas outlet.

Figure 2:
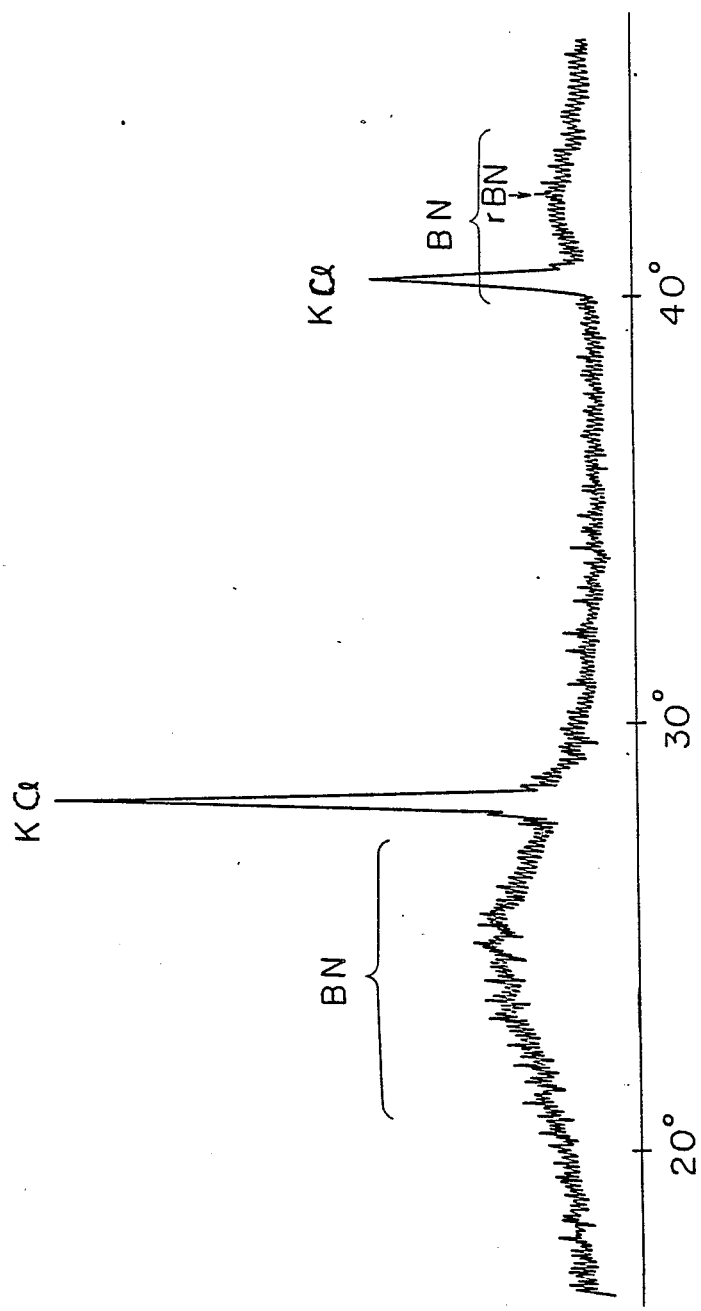
FIG. 2 is an X-ray diffraction diagram of a specimen in Example 1 of the present invention, which has been held for one hour at a heating temperature of 1050° C.

The mixture powder 7 of KBH$_4$ and NH$_4$Cl as the raw material which is placed in the furnace interior was heated at a temperature rise rate of about 300° C. per one hour by heating the graphite heat generating body 5 by the high frequency heating coil. After the temperature reached 1050° C., the raw material was kept at that temperature level for five hours, followed by cooling the same and then taking out of the furnace. The end product was found to be light yellow powder of boron nitride with a purity of 99.5%. The X-ray diffraction diagram of this boron nitride powder had a broad range as shown in FIG. 2, which consisted principally of amorphous boron nitride with no hexagonal system boron nitride having been observed. It was also seen that a slight diffraction ray of rhombohedral system boron nitride was present in this X-ray diffraction diagram.

EXAMPLE 2

In the same manner as in Example 1 above, the temperature was elevated to 1050° C. and the raw material was kept at that temperature level for one hour. Thereafter, the temperature was elevated to 2100° C. and the raw material was again kept at that temperature level for two hours. The product as obtained was found to be a mixture powder of hexagonal system boron nitride, amorphous boron nitride, and a small amount of rhombohedral system boron nitride.

EXAMPLE 3

Using $NaBH_4$ and $NH_4Cl$ as the raw material, the same operation as in Example 1 above was conducted. The product obtained was powder with amorphous boron nitride as the principal constituent.

EXAMPLE 4

Using $Li_3BH_4$ and $NH_4Cl$ as the raw material, the same operation as in Example 1 above was conducted. The product obtained was the same as in Example 3 above.

We claim:
1. A process for producing amorphous boron nitride, substantially free from hexagonal system boron nitride and oxygen, which comprises heating a mixture consisting of a borohydride of an alkali metal and ammonium chloride at a temperature within a range of from 800° to 1100° C. in a non-oxidizing atmosphere.
2. The process for producing boron nitride according to claim 1, wherein said borohydride of alkali metal and ammonium chloride is mixed in such a ratio that nitrogen is in an equivalent or greater quantity in a molar ratio with respect to boron.
3. The process according to claim 1 wherein said alkali metal borohydride is $LiBH_4$, $NaBH_4$, or $KBH_4$.
4. The process for producing amorphous boron nitride according to claim 1, wherein said non-oxidizing gas is nitrogen gas, ammonia gas or argon gas.

* * * * *